US006271892B1

(12) United States Patent
Gibbon et al.

(10) Patent No.: US 6,271,892 B1
(45) Date of Patent: Aug. 7, 2001

(54) METHOD AND APPARATUS FOR COMPRESSING A SEQUENCE OF INFORMATION-BEARING FRAMES HAVING AT LEAST TWO MEDIA

(75) Inventors: David Crawford Gibbon, Lincroft; Behzad Shahraray, Freehold, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/252,861

(22) Filed: Jun. 2, 1994

(51) Int. Cl.[7] ............................... H04N 7/18; H04N 9/74
(52) U.S. Cl. ........................................ 348/700; 348/589
(58) Field of Search ...................... 548/589, 590, 548/591; 358/335; 395/154, 114, 144; 348/384, 390, 699, 413, 416, 461, 467, 468, 478, 700

(56) References Cited

U.S. PATENT DOCUMENTS

| | | | |
|---|---|---|---|
| 4,823,184 | 4/1989 | Belmares-Sarabia et al. ...... | 348/700 |
| 5,020,890 | 6/1991 | Oshima et al. ...................... | 350/500 |
| 5,027,205 | 6/1991 | Avis et al. ............................ | 348/699 |
| 5,032,905 | 7/1991 | Koga ..................................... | 248/700 |
| 5,034,816 | 7/1991 | Morita et al. ........................ | 348/700 |
| 5,099,322 | 3/1992 | Gove .................................... | 348/700 |
| 5,134,472 | 7/1992 | Abe ...................................... | 348/700 |
| 5,172,281 * | 12/1992 | Ardis et al. .......................... | 364/409 |
| 5,179,449 | 1/1993 | Doi ...................................... | 358/311 |
| 5,192,964 | 3/1993 | Shinohara et al. .................. | 354/202 |
| 5,210,559 | 5/1993 | Ohki .................................... | 354/202 |
| 5,231,492 * | 7/1993 | Dangi et al. ......................... | 348/423 |
| 5,235,419 | 8/1993 | Krause ................................. | 348/416 |
| 5,265,180 | 11/1993 | Golin .................................... | 382/56 |
| 5,267,034 | 11/1993 | Miyatake et al. .................... | 348/416 |
| 5,428,774 * | 6/1995 | Takahashi et al. ................... | 395/154 |
| 5,440,336 * | 8/1995 | Buhro et al. ......................... | 348/13 |
| 5,467,288 * | 11/1995 | Fasciano et al. ................. | 364/514 R |
| 5,471,576 * | 11/1995 | Yee ...................................... | 395/154 |
| 5,481,296 * | 1/1996 | Cragun et al. ....................... | 348/461 |

OTHER PUBLICATIONS

PBS Einigneering Report No. E–7709–C, "Television Captioning For The Deaf: Signal and Display Specifications", John Lentz et al., Revised May 1980, pp. 1–17.

"Knowledge Guided Parsing in Video Databases", Proc. SPIE Storage and Retrieval for Image and Video Databases (SPIE vol. 1908), D. Swanberg et al. pp. 13–24, San Jose, Feb. 1993.

(List continued on next page.)

*Primary Examiner*—Vu Le
(74) *Attorney, Agent, or Firm*—Barry H. Freedman

(57) ABSTRACT

An apparatus and method for compressing a sequence of frames having at least first and second information-bearing media components selects a plurality of representative frames from among the sequence of frames. The representative frames represent information contained in the first information-bearing media component. A correspondence is then formed between each of the representative frames and one of a plurality of segments of the second information-bearing media component. The representative frames, the plurality of segments of the second information-bearing media component and the correspondence between them are recorded for subsequent retrieval. If the first information-bearing media component is a video component composed of a plurality of scenes, a representative frame may be selected from each scene. Additionally, if the second information-bearing media component is a closed-caption component, a printed rendition of the representative frames and the closed-caption component may be provided. The printed rendition constitutes a pictorial transcript in which each representative frame is printed with a caption containing the closed-caption text associated therewith.

24 Claims, 3 Drawing Sheets

OTHER PUBLICATIONS

"Automatic Video Indexing and Full Video Search for Object Appearances" Proc. 2nd Working Conference on Visual Database Systems, (Visual Database Systems II) A Nagasaka et al., Ed. 64, E. Knuth and L. M. Wenger (Elsevier Science Publishers), pp. 113–27.

"Video Browsing Using Brightness Data", Proc. SPIE Visual Communications and Image Processing, (VCIP '91), K. Otsuji et al., SPIE vol. 1606, pp. 980–989.

*Digital Pictures Representation and Compression, Applications of Communications Theory*, A. N. Netravali and B. G. Haskell, 1988, Chapter 5, pp. 334–340.

Co–pending U.S. Patent Application Serial No. 08/171,136 Filed Dec. 21, 1993, "Method and Apparatus For Detecting Abrupt and Gradual Scene Changes In Image Sequences", B. Shahraray Case 3.

Co–pending U. S. Patent Application Serial No. 08/191,234 Filed Feb. 4, 1994, "Method For Detecting Camera–Motion Induced Scene Changes", B. Shahraray Case 4.

* cited by examiner

FIG. 3

 >> united nations envoy rolf ekeus said today he had resolved the dispute with iraq over weapons monitoring. He gave no details, but said there was no longer any reason for military action. We have a report from baghdad by robert moore of independent television news.

 >> it was a final diplomatic mission, an attempt to mend the fraying relationship between iraq and the united nations.

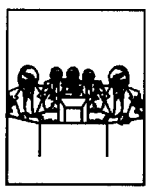 This morning, after four days of tough talking and brinkmanship, iraq appears to have made the crucial concession, tariq aziz, iraq's deputy prime minister, agreeing to the concept of long-term monitoring of the country's weapons systems.

 For rolf ekeus, the satisfaction he has almost certainly averted u.n.-backed military action against iraq.

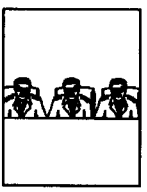

 Other issues remain in dispute, but a new framework for settling them is now said to be in place.

 >> i wouldn't say that we have a clear-cut settlement, but i think we are on the way to break out of that almost quite dangerous, dangerous situation.

 >> for the last two weeks, ordinary iraqis have been living in fear of a fresh missile or air attack, but with the crisis defused and compliance agreed on, there is now growing hope the u.n. will consider lifting sanctions.

METHOD AND APPARATUS FOR COMPRESSING A SEQUENCE OF INFORMATION-BEARING FRAMES HAVING AT LEAST TWO MEDIA

TECHNICAL FIELD

This invention relates generally to a method of compressing a sequence of information-bearing frames, and more particularly to a method of compressing a sequence of information-bearing frames having at least two media components such as a video program.

BACKGROUND

Multimedia sources of information such as video programs are one form of multimedia data composed of at least two distinct media components. For example, a video program is composed of a full motion video component and an audio component. A number of methods are known for reducing the large storage and transmission requirements of the video component of video programs. For example, certain compression methods (such as JPEG) take advantage of spatial redundancies that exist within an individual video frame to reduce the number of bytes required to represent the frame. Additional compression may be achieved by taking advantage of the temporal redundancy that exists between consecutive frames, which is the basis for known compression methods such as MPEG. These known compression methods generate a fixed number of frames per unit time to preserve the motion information contained in the video program.

In contrast to the compression methods mentioned above, other methods compress video programs by selecting certain frames from the entire sequence of frames to serve as representative frames. For example, a single frame may be used to represent the visual information contained in any given scene of the video program. A scene may be defined as a segment of the video program over which the visual contents do not change significantly. Thus, a frame selected from the scene may be used to represent the entire scene without losing a substantially large amount of information. A series of such representative frames from all the scenes in the video program provides a reasonably accurate representation of the entire video program with an acceptable degree of information loss. These compression methods in effect perform a content-based sampling of the video program. Unlike the temporal or spatial compression methods discussed above in which the frames are uniformly spaced in time, a content-based sampling method performs a temporally non-uniform sampling of the video program to generate a set of representative frames. For example, a single representative frame may represent a long segment of the video program (e.g., a long scene in which a person makes a speech without substantially changing position for an extended period) or a very short segment of the video program (e.g., a scene displayed in the video program for only a few seconds).

Methods for automatically generating representative images from video programs are known. These methods may detect the boundaries between consecutive shots and may additionally detect scene changes that occur within the individual shots. An example of a method for locating abrupt and gradual transitions between shots is disclosed in patent application Ser. No. 08/171,136, filed Dec. 21, 1993, and entitled "Method and Apparatus for Detecting Abrupt and Gradual Scene Changes In Image Sequences," the contents of which are hereby incorporated by reference. A method for detecting scene changes that occur within individual shots has been disclosed in patent application Ser. No. 08/191,234, filed Feb. 4, 1994, entitled "Camera-Motion Induced Scene Change Detection Method and System," the contents of which are also hereby incorporated by reference.

Content-based sampling methods are typically employed for indexing purposes because the representative frames generated by such methods can efficiently convey the visual information contained in a video program. However, these methods fail to convey all the useful information contained in a multimedia format such as video because they only compress one media component, namely, in the case of video, the video component, while excluding the remaining media component (e.g., audio) or components.

SUMMARY

The present invention provides an apparatus and method for compressing a sequence of frames having at least first and second information-bearing media components. The sequence of frames may constitute, for example, a video program in which the first information-bearing component is a video component and the second information-bearing component is a closed-caption component. In accordance with the invention, a plurality of representative frames are selected from among the sequence of frames. The representative frames represent information contained in the first information-bearing media component. A correspondence is then formed between each of the representative frames and one of a plurality of segments of the second information-bearing media component. The representative frames, the plurality of segments of the second information-bearing media component and the correspondence between them are recorded for subsequent retrieval.

In one embodiment of the invention, the representative frames are selected by sampling the sequence of frames in a content-based manner. For example, if the first information-bearing media component is a video component composed of a plurality of scenes, a representative frame may be selected from each scene. Additionally, if the second information-bearing media component is a closed-caption component, a printed rendition of the representative frames and the closed-caption component may be provided. The printed rendition constitutes a pictorial transcript in which each representative frame is printed with a caption containing the closed-caption text associated therewith. One advantage provided by this embodiment of the invention is that while the information embodied in the original format (e.g., a video program) typically requires additional equipment (e.g., a video cassette recorder and monitor) to be understood, the information embodied in the printed pictorial transcript is self-contained and can be understood directly without requiring additional processing or equipment.

In an alternative embodiment of the invention, a method is provided for displaying a compressed rendition of a sequence of frames having at least first and second information-bearing media components. In accordance with the method, a plurality of representative frames are received which represent information contained in the first information-bearing media component. Additionally, a signal is received that has information that forms a correspondence between each of the representative frames and a segment of the second information-bearing media component. Finally, the representative frames and the segment of the second information-bearing media component are displayed in a manner determined by the correspondence therebetween.

BRIEF DESCRIPTION OF THE DRAWINGS

FIG. 3 is an example of one page of a printed pictorial transcript generated from a television news program in accordance with method of the present invention.

DETAILED DESCRIPTION

Certain video programs such as television broadcasts often include a closed-caption component as part of each frame of video. When decoded, the closed-caption component of each frame contains up to two alphanumeric characters or control characters. The sequence of these characters form words and sentences over several or more frames. This text is typically recovered by a dedicated closed-caption decoder and superimposed on the frames displayed on a video screen. The text contains dialog or other information that corresponds to the audio portion of the program. Details regarding the addition of closed-caption information to a video source are disclosed, for example, in Report No. E-7709-C by the Public Broadcasting Service entitled "Television Captioning For the Deaf: Signal and Display Specifications," by John Lentz et al., May, 1980.

The present invention will be described in terms of a method for compressing a closed-caption video program in which a representative frame from each scene in the program is combined with the text generated by decoding the closed-caption component of the video program. As used herein the term video is not limited to any particular video standard but rather refers to any sequence of frames having at least two information-bearing media components, one of which is a visual information component. The frames may be recorded in any format, including film, conventional video, or various electronic forms such as a computer memory. The term frame refers to the atomic elements of recorded information for all the media components employed in connection with a particular format.

While the present invention will be described in terms of a method of compressing a video program having a closed-caption component, it will be understood by one of ordinary skill in the art that this method is equally applicable to any source of multimedia information having at least two media components. For example, the method may be employed to compress a video program having a video component and an audio component. The audio component may include speech and other auditory information such as music, for example. If desired, the audio component may undergo a speech-to-text conversion process so that a pictorial transcript as described below may be generated.

Figure 1:
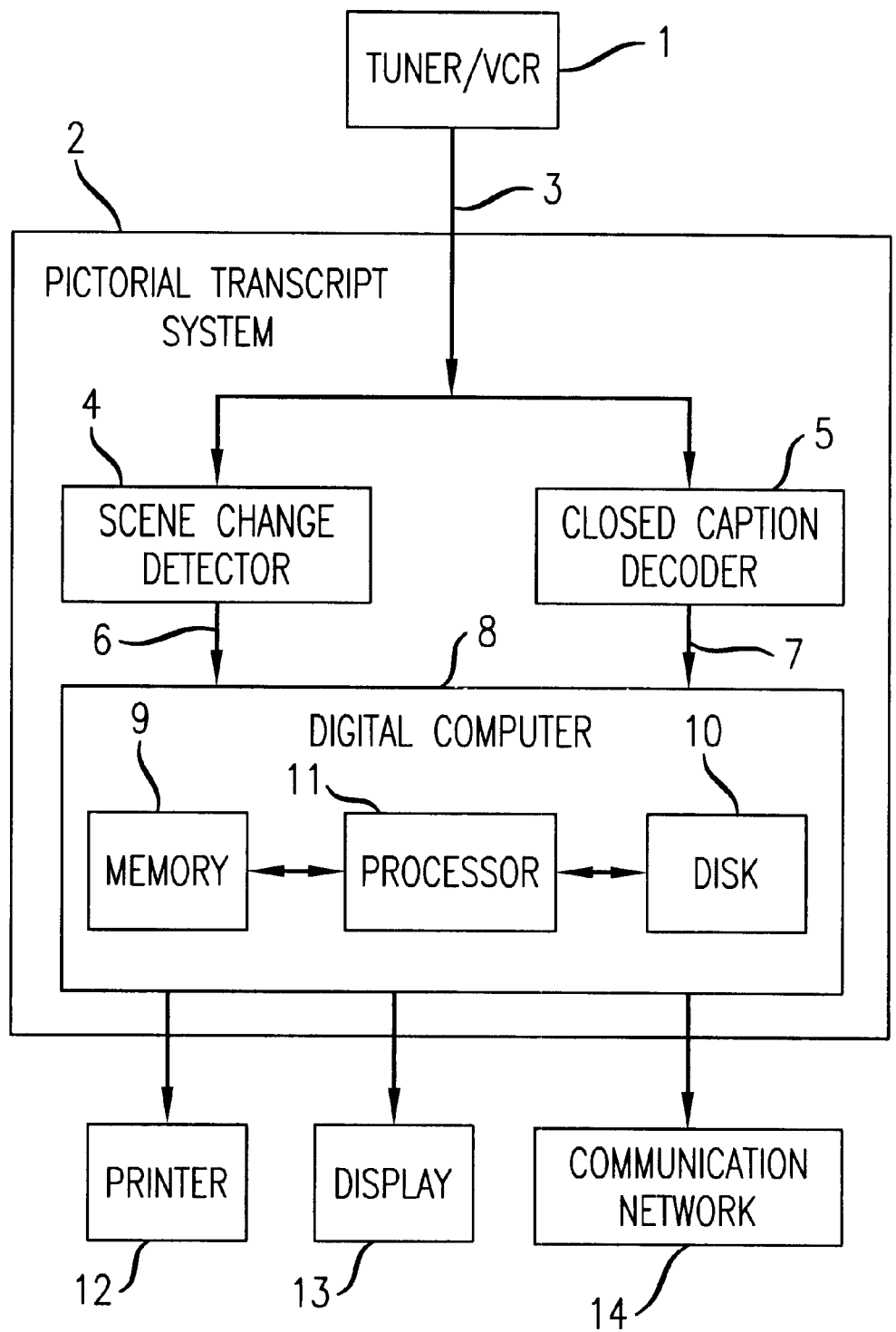
FIG. 1 is a block diagram of one example of an apparatus for compressing multimedia data in accordance with the present invention.

FIG. 1 shows a block diagram of an apparatus 2 for compressing multimedia data in accordance with the present invention. For purposes of illustration the apparatus 2 will be described as receiving a video input from a video input source 1 such as a video tuner connected to an antenna or cable television, a video-cassette recorder, or any other source capable of providing video and closed-caption information. The apparatus 2 is composed of a scene change detector 4, a closed-caption decoder 5 and a digital computer 8. The scene change detector 4 operates on the video signal received from the input source 1 to generate a representative frame for each scene in the video signal. Scene change detectors that select representative frames are known and examples of such are provided in the above-mentioned references that are incorporated by reference. The representative frames each contain visual information representing the visual information content of an entire scene. The scene change detector 4 may include an image digitizer for digitizing the input if an analog input source is employed rather than a digital input source. The representative frames extracted by the scene change detector 4 are transmitted to the digital computer 8. The closed-caption decoder 5, which also receives the video signal from the input source 1, extracts the closed-caption characters from the video signal and transmits them to the digital computer 8 in decoded form. The digital computer 8 stores the representative frames and the closed-caption information in a retrievable format in, for example, the main memory 9 or the hard disk 10. As described in more detail below, the digital computer 8 also establishes a correspondence between each representative frame and a segment of the closed-caption information by constructing a correspondence table. The representative frames and closed-caption component may be subsequently retrieved and directed to a printer 12 or a display 13, or alternatively, transmitted over a communications network 14.

A content-based compression method that generates a single representative frame for each of the N scenes in a video program will retain N representative frames $I_1$ through $I_N$. Examples of such compression methods are disclosed in the above-mentioned references that are incorporated by reference. Since each representative frame represents the visual information contained in a single scene, each representative frame has associated with it a time interval equal to the length of the scene from which the frame is selected. For example, the time interval associated with representative frame $I_i$ begins with the detection of the ith scene boundary and ends one frame prior to the detection of the (i+1)th scene boundary. The series of consecutive frames constituting the scene from which the representative frame $I_i$ is selected is denoted $VS_i$. Accordingly, the set of N representative frames $I_1$ through $I_N$ divide the video program into N non-overlapping visual segments $VS_1$ through $VS_N$ and each representative frame $I_i$ is associated with visual segment $VS_i$.

Figure 2:
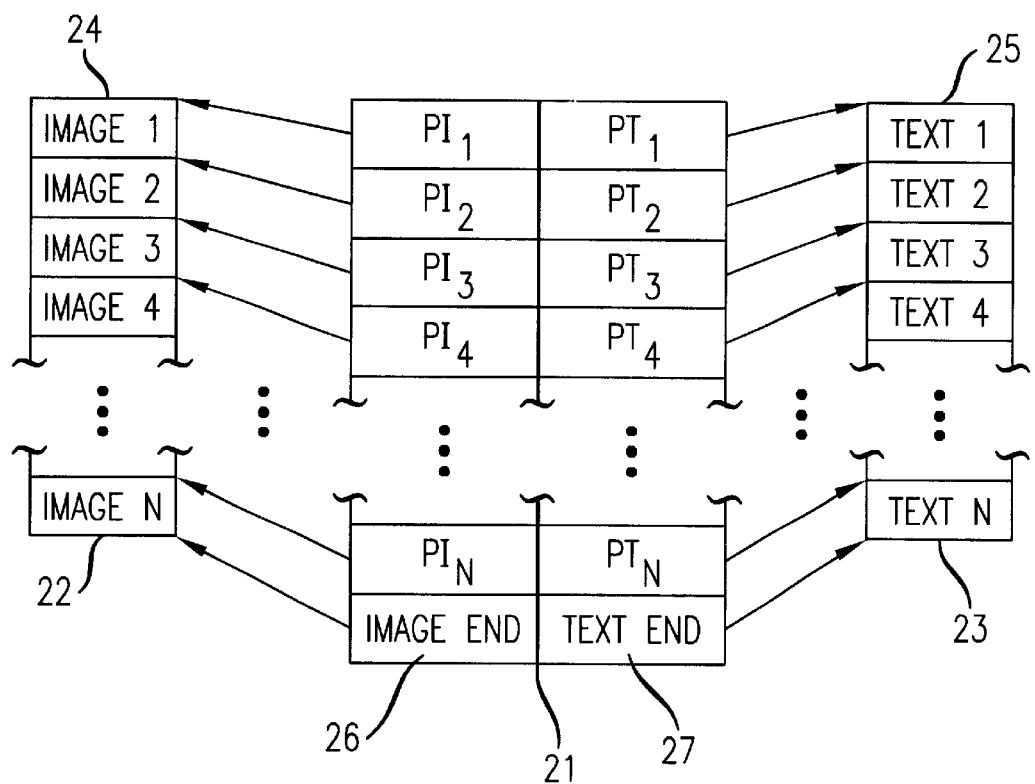
FIG. 2 shows an example of a correspondence table for locating representative frames and closed-caption components of a closed-caption video program.

Since each frame of the video program is associated with a portion of the closed-caption component, each of the series of frames constituting visual segment $VS_i$ is associated with a closed-caption segment denoted $TS_i$. Accordingly, when the method of this invention divides the video program into N visual segments $VS_1$ through $VS_N$ each being characterized by a single representative frame, it will also divide the closed-caption component into N segments. The closed-caption component may be divided into segments, for example, by time-stamping the closed-caption component as it is received by the computer 8 each time a new visual segment is detected by the scene change detector 4. The N closed-caption segments $TS_i$ correspond in a one-to one-manner with the N visual segments $VS_i$. This correspondence between the representative frames of each visual segment $VS_i$ and the N closed-caption segments $TS_i$ may be established by a correspondence table such as shown in FIG. 2.

The correspondence table 21 employs a frame memory 22 and a text memory 23 which are located in the digital computer 8. The frame memory 22 stores the representative frames $I_1$ through $I_N$ produced by the scene change detector 4 and the text memory 23 stores the closed-caption segments $TS_1$ through $TS_N$. The correspondence table 21 has at least two columns and N rows for the N representative frames. The first column 26 of the table contains information that points to frames $I_1$ through $I_N$. This information may be in the form of a pointer (denoted in FIG. 2 as frame pointers $PI_1$ through $PI_N$) that points to the location of the representative frames stored in memory 22. For example, pointer $PI_1$ points to representative frame $I_1$ located in row 1. This information is sufficient to determine the beginning and end locations of the frames in the memory 22 if the frames are of fixed size. In the event the frames are of variable size, the end of frame $I_i$ can be determined with pointer $PI_{(i+1)}$, assuming the frames are stored in sequential order in consecutive memory locations. The second column 27 of the correspondence table contains information that points to the closed-caption segments $TS_1$ through $TS_N$. Similar to the first column of the table, information pertaining to frame $I_i$ is contained in row i of the second column 27. This information also may be in the form of a pointer, referred to as closed-caption pointer $PT_i$, which points to the location of closed-caption segment $TS_i$. The end of the closed-caption segment $TS_i$ associated with frame $I_i$ can be located with pointer $PT_{(i+1)}$. FIG. 2 shows two additional pointers that may be employed, an image end pointer 26, and text end pointer 27, which indicate the end of the Nth representative frame and Nth closed-caption segment, respectively.

The organization of the correspondence table is not limited to the example described above. One of ordinary skill in the art will recognize that the correspondence table may be implemented in any desired manner to ensure that each representative frame is properly correlated with its associated closed-caption segment so that both components are readily retrievable. For example, the correspondence table may contain additional columns for storing information such as the size of the representative frames and the closed-caption segments, the frame numbers that indicate the beginning and end of each visual segment, the length of each scene, or the number of characters in the closed-caption segments. Alternatively, each representative frame and the closed-caption segments associated therewith may be stored as individual files. In this arrangement the entries in the columns of the correspondence table will identify the location or name of each file.

Once the representative frames and closed-caption segments constituting the compressed video program have been extracted from the original video program and the correspondence table prepared, the data may be recorded in any convenient manner for subsequent retrieval. Thereafter the data may be printed, displayed or transmitted in any desired format. For example, the data may be printed, displayed, or transmitted in the form of a pictorial transcript in which a series of representative frames are each provided with captions of the closed-caption text. An example of a pictorial transcript format is shown in FIG. 3 for a portion of television news program. The transcript may be printed with a commercial text processing package that is capable of conveniently incorporating pictures into text.

Prior to printing the pictorial transcript, it may be necessary to remove non-printable control characters contained in the closed-caption signal which are used to control display functions. These characters control such features as the color of the displayed characters, the font, and the location of the text line on the display screen, for example. In addition to being non-printable, the control characters may adversely effect the proper division of the closed-caption component based on individual scenes in the manner described above. In particular, the control characters may cause the text contained in the closed-caption component to be divided in the middle of a sentence. This improper division of the closed-caption component may occur for other reasons as well, including improper synchronization between the video component and the closed-caption component, for example. Improper synchronization may occur because of a delay in the detection of a scene boundary or a delay in transmitting the closed-caption component to the digital computer. Regardless of the reason for the improper division, it may be desirable to process the raw text to remove the control characters and shift the boundary between adjacent closed-caption segments so that word fragments are merged into complete words and sentence fragments are merged into complete sentences. Word fragments may be readily identified by locating characters that fall on opposite sides of a closed-caption pointer which are not separated by an appropriate character such as space. These characters then may be joined to form complete words. Similarly, sentences fragments may be identified by locating words on opposite sides of a closed-caption pointer which are not separated by a character such as a question mark, exclamation mark, or a period. These fragments are then merged into a single sentence. The closed-caption pointer in then adjusted accordingly to include complete words and sentences in the text which are associated with a single representative image.

Rather than removing the control characters, the control characters may be replaced with another character or characters that can be properly interpreted in subsequent processing stages such as the text processing stage. For example, a control character that is used to change the font or the color in the closed-caption display window may be replaced with the corresponding font change command used in the text processing package that is employed.

The characters transmitted in the closed-caption component of a video program are typically all transmitted in the upper case. Accordingly, in addition to removing or replacing control characters prior to printing the pictorial transcript, it may desirable to first process the raw text extracted from the closed-caption component to convert some of the upper case characters to lower case in a manner consistent with ordinary printed text. This processing may be accomplished in a number of ways. For example, the upper case characters may first all be converted to lower case characters. The first character following a punctuation character such as a period or question mark is then capitalized. Finally, many proper nouns that require capitalization may be located in an electronically stored dictionary. The text in the example of a pictorial transcript shown in FIG. 3 has been partially processed in this manner. The characters were all converted from upper case to lower case and the first character following a period capitalized. As is apparent from the figure, proper nouns have not been capitalized.

What is claimed is:

1. A method of representing a sequence of frames having at least first and second information-bearing media components, in which the first and second information-bearing media components are different from one another, said method comprising the steps of:

selecting a plurality of representative frames representing information contained in the first information-bearing media component;

forming a correspondence between each of the representative frames and a segment of the second information-bearing media component; and recording said representative frames, said segment of the second information-bearing media component and the correspondence therebetween.

2. The method of claim 1 wherein the step of selecting representative frames comprises the step of performing a content-based sampling of the sequence of frames to select the representative frames.

3. The method of claim 2 wherein the first information-bearing media component is a video component.

4. The method of claim 3 wherein the video component includes a series of scenes and the step of performing a content-based sampling to select the representative frames comprises the step of selecting a representative frame from each scene.

5. The method of claim 3 wherein the second information-bearing media component is a closed-caption component.

6. A method of representing a sequence of visual information-bearing frames having a closed-caption component representing textual information associated therewith, said method comprising the steps of:

dividing the sequence of frames and closed-caption component into a plurality of segments;

retaining a representative frame from each segment;

retaining the closed-caption component of each segment; and recording the representative frame and the closed-caption component for each segment.

7. The method of claim 6 wherein the step of dividing the sequence of frames comprises the step of performing a content-based sampling of the sequence of frames to select the representative frames.

8. The method of claim 7 wherein each segment constitutes a single scene.

9. The method of claim 8 further comprising the step of decoding the closed-caption component.

10. The method of claim 9 further comprising the steps of generating and recording a correspondence table for locating the segment of the closed-caption component associated with each representative frame.

11. The method of claim 10 further comprising the step of generating a printed rendition of the representative frames and closed-caption component for each scene to provide a printed pictorial transcript.

12. The method of claim 10 further comprising the step of displaying the representative frame and closed-caption component for each scene to provide a pictorial transcript.

13. The method of claim 6 wherein each segment constitutes a single scene.

14. A method of compressing a sequence of visual information-bearing frames having an audio component associated therewith, said method comprising the steps of:

dividing the sequence of frames and associated audio component into a plurality of segments;

retaining a representative frame from each segment;

retaining the audio component of each segment; and recording each representative frame and the audio component segment associated therewith.

15. The method of claim 14 wherein the step of dividing the sequence of frames comprises the step of performing a content-based sampling of the sequence of frames to select the representative frames.

16. The method of claim 15 wherein each segment constitutes a single scene.

17. The method of claim 16 further comprising the steps of generating and recording a correspondence table for locating the audio component segment associated with each representative frame.

18. The method of claim 17 wherein the audio component includes a speech component and further comprising the step of converting the speech component to a text component.

19. The method of claim 18 further comprising the step of generating a printed rendition of the representative frame and the text component for each scene to provide a printed pictorial transcript.

20. The method of claim 14 wherein each segment constitutes a single scene.

21. An apparatus for representing a sequence of frames having at least first and second information-bearing media components, in which said first and second information-bearing media components are different from one another, said apparatus comprising;

means for selecting a plurality of representative frames representing information contained in the first information-bearing media component;

means for forming a correspondence between each of the representative frames and one of a plurality of segments of the second information-bearing media component; and means for recording said representative frames, said plurality of segments of the second information-bearing media component and thecorrespondence therebetween.

22. The apparatus of claim 21 wherein the selecting means comprises means for performing a content-based sampling of the sequence of frames to select the representative frames.

23. The apparatus of claim 22 wherein the selecting means comprises a scene change detector.

24. The apparatus of claim 22 further comprising means for decoding the second information-bearing component.

* * * * *